United States Patent
Dewan et al.

(10) Patent No.: US 11,409,877 B2
(45) Date of Patent: Aug. 9, 2022

(54) FIRMWARE VERIFICATION MECHANISM

(71) Applicant: Intel Corporation, Santa Clara, CA (US)

(72) Inventors: Prashant Dewan, Portland, OR (US); Chao Zhang, Shanghai (CN); Nivedita Aggarwal, Portland, OR (US); Aditya Katragada, Austin, TX (US); Mohamed Haniffa, Tamilnadu (IN); Kenji Chen, Taiwan (CN)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 16/832,152

(22) Filed: Mar. 27, 2020

(65) Prior Publication Data

US 2020/0226261 A1 Jul. 16, 2020

(51) Int. Cl.
*G06F 21/57* (2013.01)
*G06F 8/65* (2018.01)
*G06F 21/64* (2013.01)
*G06F 21/44* (2013.01)

(52) U.S. Cl.
CPC .............. *G06F 21/572* (2013.01); *G06F 8/65* (2013.01); *G06F 21/64* (2013.01); *G06F 2221/033* (2013.01)

(58) Field of Classification Search
CPC .......... G06F 21/572; G06F 8/65; G06F 21/64; G06F 2221/033; G06F 21/44
See application file for complete search history.

(56) References Cited

U.S. PATENT DOCUMENTS

| | | | | |
|---|---|---|---|---|
| 9,397,835 | B1* | 7/2016 | Campagna | H04L 9/0891 |
| 10,311,224 | B1* | 6/2019 | Farhan | H04L 9/3226 |
| 10,366,232 | B1* | 7/2019 | Kuan | G06F 21/51 |
| 11,281,769 | B2* | 3/2022 | Gu | G06F 21/54 |
| 2006/0107032 | A1* | 5/2006 | Paaske | G06F 21/57 |
| | | | | 713/2 |
| 2007/0118530 | A1* | 5/2007 | Chow | G06F 8/65 |
| 2007/0143629 | A1* | 6/2007 | Hardjono | H04L 63/0823 |
| | | | | 713/181 |
| 2008/0052698 | A1* | 2/2008 | Olson | G06F 8/658 |
| | | | | 717/168 |

(Continued)

FOREIGN PATENT DOCUMENTS

CN 113449284 9/2021

OTHER PUBLICATIONS

Basnight, Zachry et al. "Firmware Modification Attacks on Programmable Logic Controllers", International Journal of Critical Infrastructure Protection, vol. 6, Issue 2, 2013, pp. 76-84. (Year: 2013).*

*Primary Examiner* — Darren B Schwartz
(74) *Attorney, Agent, or Firm* — Jaffery Watson Mendonsa & Hamilton LLP (57) ABSTRACT

An apparatus to verify firmware in a computing system, comprising a non-volatile memory, including firmware memory to store agent firmware associated with each of a plurality of interconnect protocol (IP) agents and version memory to store security version numbers (SVNs) included in the agent firmware, a security controller comprising verifier logic to verify an integrity of the version memory by applying a hash algorithm to contents of the version memory to generate a SVN hash, and a trusted platform module (TPM) to store the SVN hash.

18 Claims, 10 Drawing Sheets

(56) References Cited

U.S. PATENT DOCUMENTS

| | | | | |
|---|---|---|---|---|
| 2008/0195868 A1* | 8/2008 | Asokan | ............... | H04L 9/3236 |
| | | | | 713/176 |
| 2009/0041252 A1* | 2/2009 | Hanna | ................. | H04L 63/12 |
| | | | | 380/278 |
| 2009/0169017 A1* | 7/2009 | Smith | ................. | G06F 21/57 |
| | | | | 380/278 |
| 2011/0087872 A1* | 4/2011 | Shah | ................. | G06F 21/575 |
| | | | | 713/2 |
| 2012/0137137 A1* | 5/2012 | Brickell | ............... | G06F 21/73 |
| | | | | 713/182 |
| 2014/0250290 A1* | 9/2014 | Stahl | ................. | H04L 9/3247 |
| | | | | 713/2 |
| 2016/0028725 A1* | 1/2016 | Benoit | ............... | H04L 63/1466 |
| | | | | 726/14 |
| 2016/0112203 A1* | 4/2016 | Thom | ................. | G06F 21/53 |
| | | | | 713/176 |
| 2016/0306977 A1* | 10/2016 | Zarakas | ............... | G06F 8/654 |
| 2017/0010875 A1* | 1/2017 | Martinez | ............... | G06F 21/60 |
| 2017/0010881 A1* | 1/2017 | Kawazu | ............... | G06F 8/65 |
| 2017/0090896 A1* | 3/2017 | Lin | ............... | G06F 8/61 |
| 2017/0308705 A1* | 10/2017 | Karaginides | ............ | G06F 8/654 |
| 2018/0060607 A1* | 3/2018 | Tasher | ............... | G06F 8/65 |
| 2019/0138294 A1* | 5/2019 | Smith | ............... | G06F 21/64 |
| 2020/0019397 A1* | 1/2020 | Duran | ............... | H04L 9/3247 |
| 2020/0226261 A1 | 7/2020 | Dewan et al. | | |

\* cited by examiner

FIRMWARE VERIFICATION MECHANISM

BACKGROUND OF THE DESCRIPTION

A system on chip (SOC) is an integrated circuit that integrates all components of a computer or other electronic system. These components include a central processing unit (CPU), memory, input/output (IO) ports and secondary storage, which are all included on a single substrate or microchip. Additionally, SOCs enable the integration of third party components via a standardized on-die interconnect protocol. However, the addition of such components may lead to security vulnerabilities.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit other equally effective embodiments.

DETAILED DESCRIPTION

In the following description, numerous specific details are set forth to provide a more thorough understanding. However, it will be apparent to one of skill in the art that the embodiments may be practiced without one or more of these specific details. In other instances, well-known features have not been described in order to avoid obscuring the embodiments.

In embodiments, a mechanism is provided to verify firmware in a SOC platform. In such embodiments, a security controller verifies an integrity of a version memory by applying a hash algorithm to contents of the version memory to generate a security version numbers (SVN) hash. Subsequently, the security controller stores the SVN hash in a trusted platform module (TPM). In still further embodiments, the security controller uses the SVN hash stored in the TPM to verify the integrity of the version memory each time new agent firmware is detected at the SOC platform. Thus, new agent firmware is not downloaded to the platform unless the integrity of the version memory has been verified.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
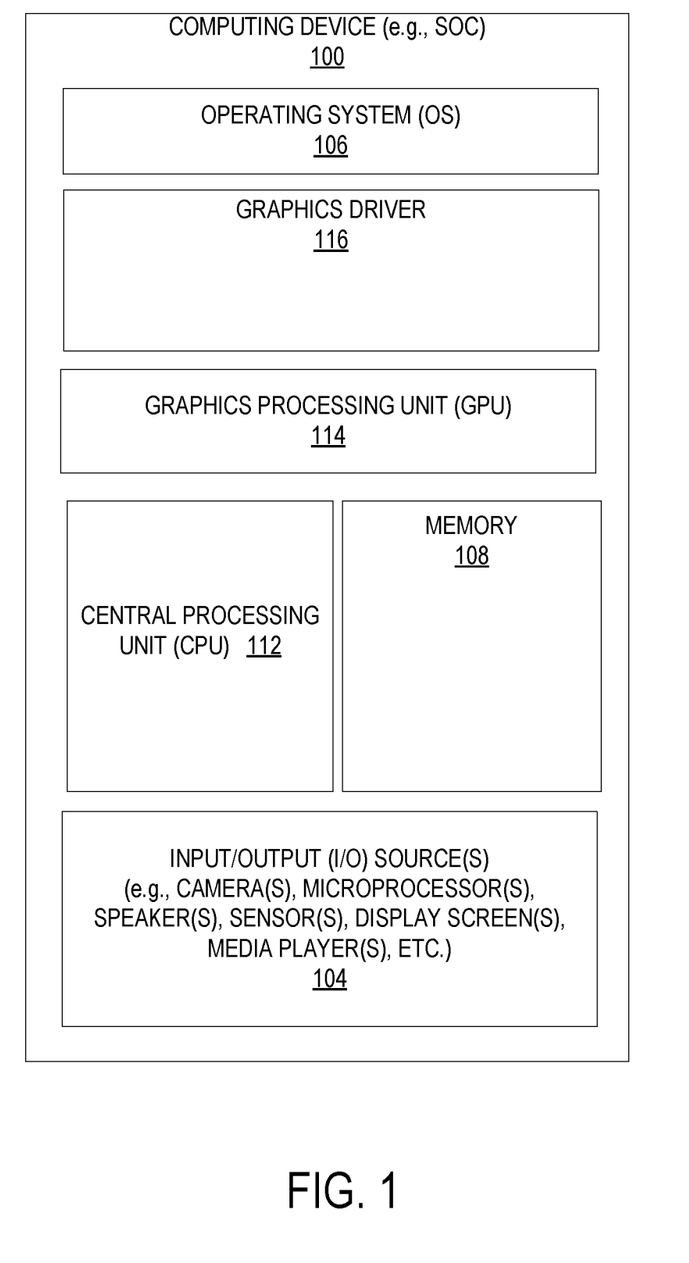
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2A:
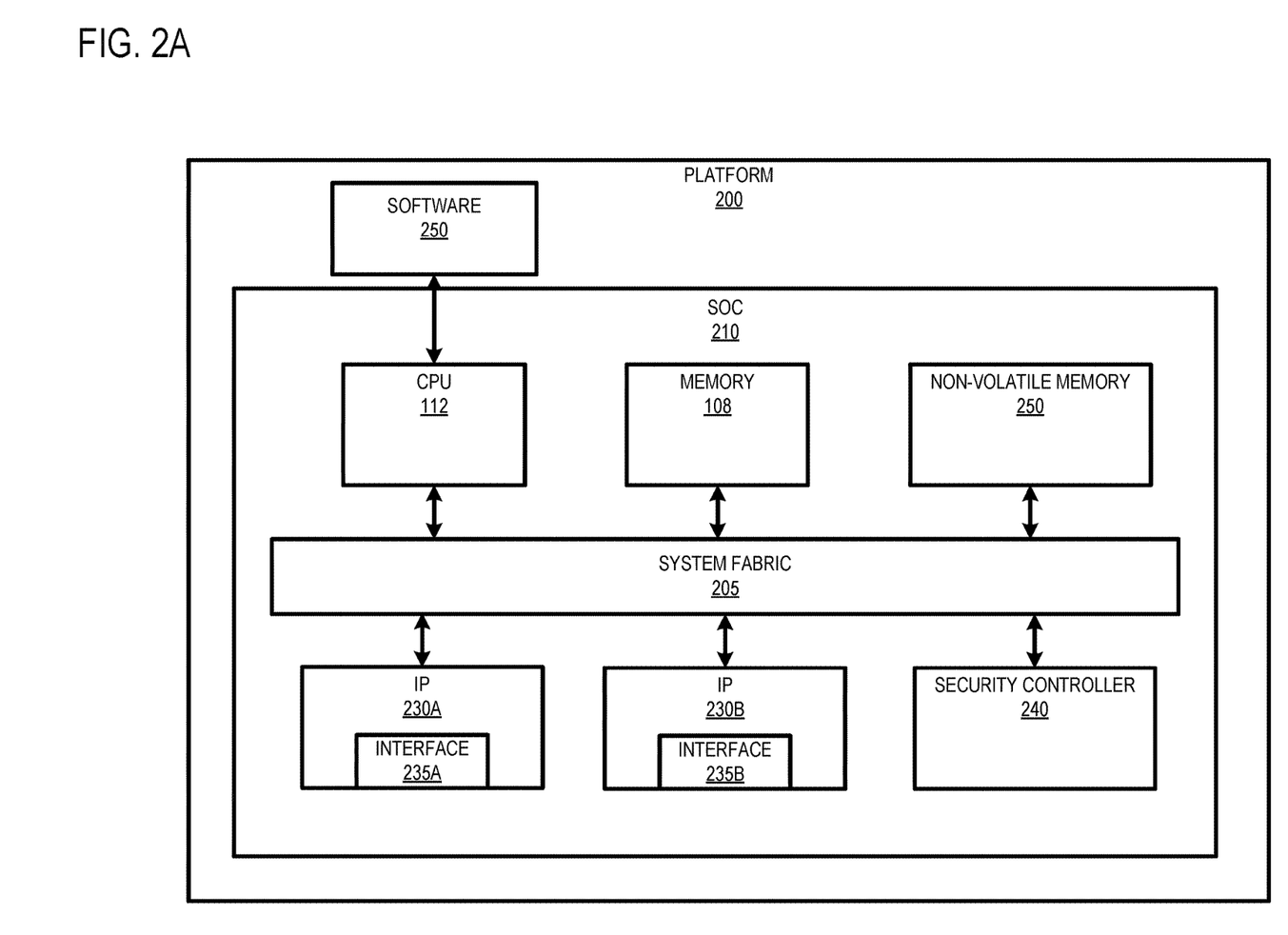
FIGS. 2A-2C illustrate embodiments of a platform.
Figure 2B:
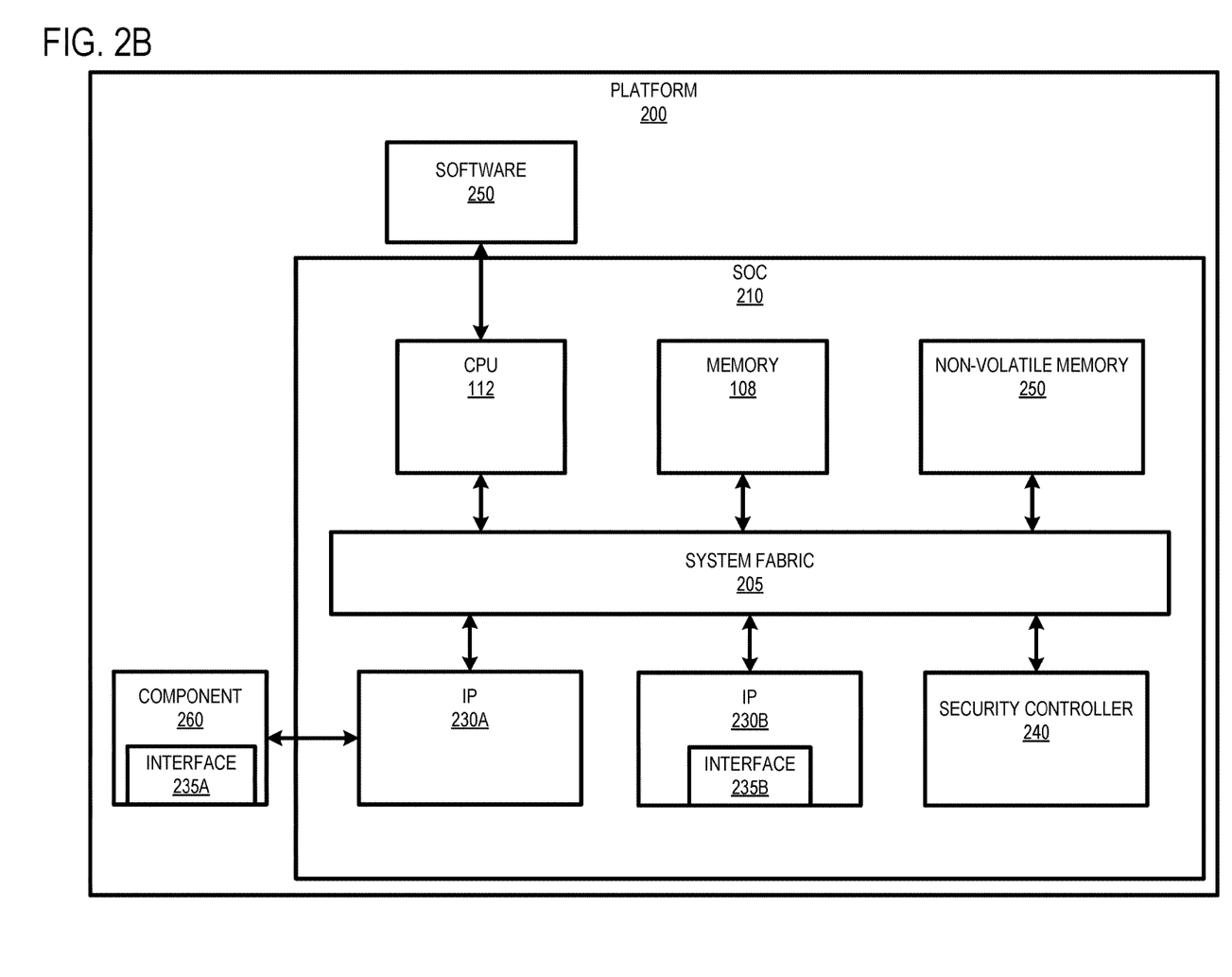
Figure 2C:
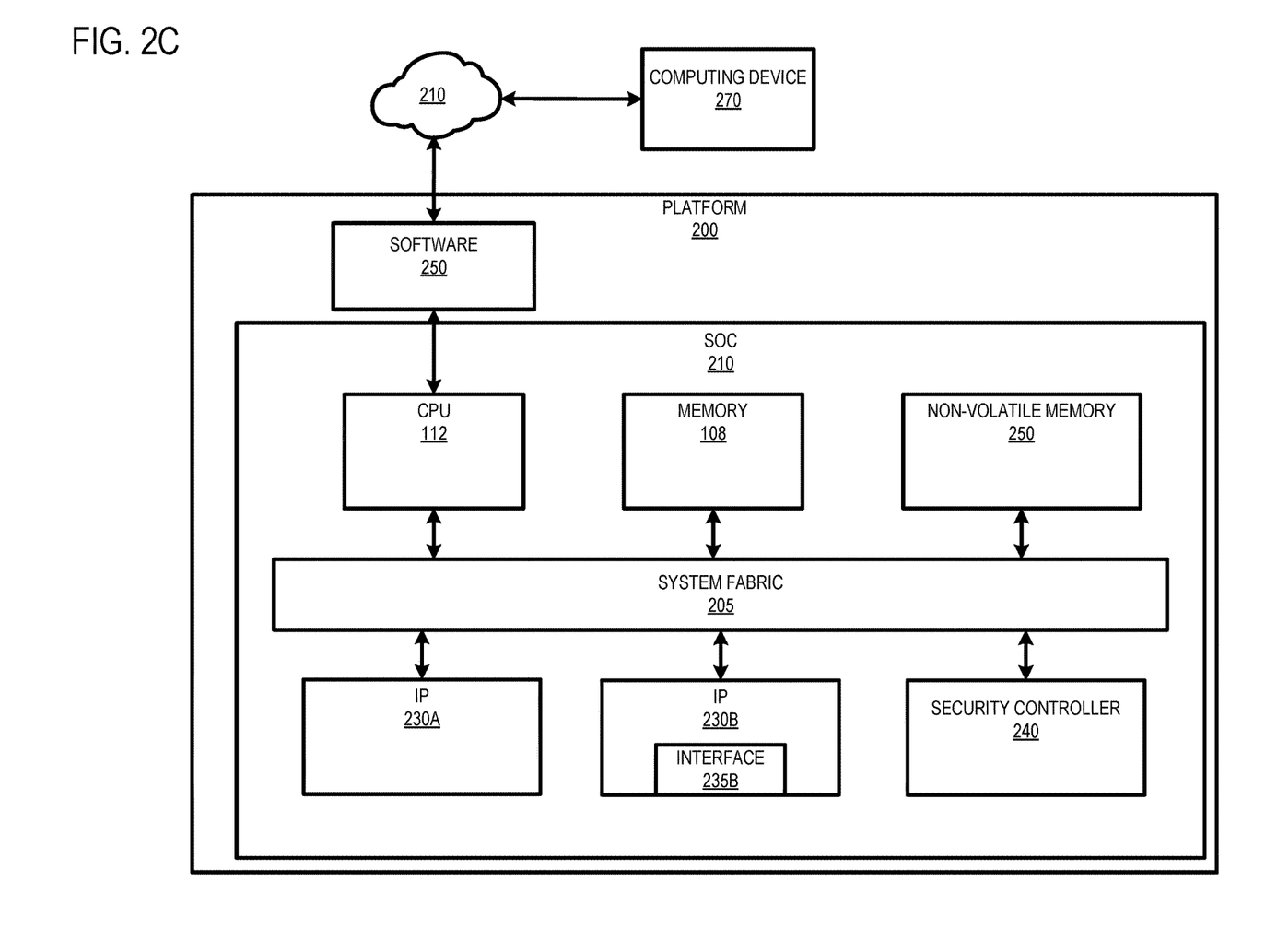

FIGS. 2A-2C illustrate embodiments of a platform 200 including a SOC 210 similar to computing device 100 discussed above. As shown in FIG. 2A, platform 200 includes SOC 210 communicatively coupled to one or more software components 250 via CPU 112. Additionally, SOC 210 includes other computing device components (e.g., memory 108) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP blocks 230A and 230B) within SOC 210. In such an embodiment, the interconnect protocol provides a standardized interface to enable third parties to design logic such as IP agents to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 to provide standardization to enable the IP agent 230 to communicate with SOC 210 components. For example, in an embodiment in which IPA agent 230 is a third party visual processing unit (VPU), interface 235 provides a standardization to enable the VPU to access memory 108 via fabric 205.

SOC 210 also includes a security controller 240 that operates as a security engine to perform various security operations (e.g., security processing, cryptographic functions, etc.) for SOC 210. In one embodiment, security controller 240 comprises an IP agent 230 that is implemented to perform the security operations. Further, SOC 210 includes a non-volatile memory 250. Non-volatile memory 250 may be implemented as a Peripheral Component Interconnect Express (PCIe) storage drive, such as a solid state drives (SSD) or Non-Volatile Memory Express (NVMe) drives.

FIG. 2B illustrates another embodiment of platform 200 including a component 270 coupled to SOC 210 via IP 230A. In one embodiment, IP 230A operates as a bridge, such as a PCIe root port, that connects component 260 to SOC 210. In this embodiment, component 260 may be implemented as a PCIe device (e.g., switch or endpoint) that includes a hardware interface 235 to enable component 260 to communicate with SOC 210 components. FIG. 2C illustrates yet another embodiment of platform 200 including a computing device 270 coupled to platform 200 via a cloud network 210. In this embodiment, computing device 270 comprises a cloud agent that is provided access to SOC 210 via software 250.

IP agents, such as agents 230, typically include firmware that stores software that is executed to perform the particular function associated with the agent. This software must be secure to prevent tampering by a malicious agent. Secure software typically includes a security version number (SVN) in order to prevent a malicious accessing of vulnerable old software. Specifically, a SVN is used to reflect a level of the security property of agent software. For maximum security, it is also a common approach to save SVNs within a nonvolatile memory that is replay and integrity protected to prevent subversion. The common method of saving SVNs is to use One Time Programmable (OTP) memory or Fuses. However, the cost of OTP memory is prohibitive for a SOC that has large number of agents with individual SVNs. In addition, using OTP or fuses removes the flexibility of refurbishing a platform since neither OTPs nor fuses can be re-written or erased.

Figure 3:
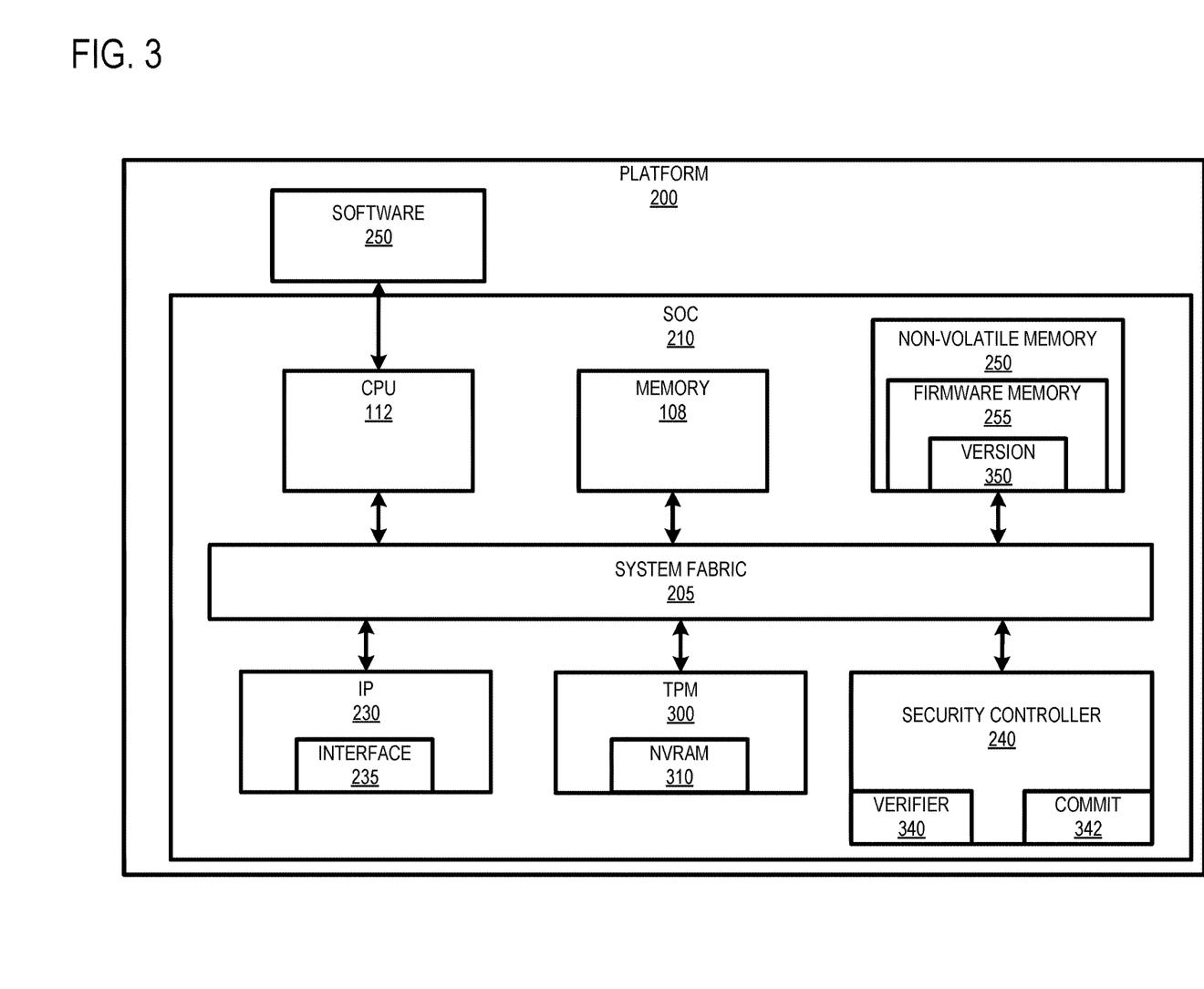
FIG. 3 illustrates yet another embodiment of a platform.

According to one embodiment, as a trusted platform module (TPM) is implemented to facilitate SVN verification. FIG. 3 illustrates yet another embodiment of platform 200 including a TPM 300. TPM 300 is a dedicated microcontroller that secures hardware via integrated cryptographic keys. In one embodiment, security controller 240 implements TPM 300 to prevent SVN rollback. In such an embodiment, security controller 240 includes a verifier agent (verifier 340) that verifies the integrity of a version memory 350 within non-volatile memory 250 as well as verifies agent SVNs. As shown in FIG. 3, non-volatile memory 250 includes a firmware memory 255 to store firmware associated with IP agents 230. Additionally, non-volatile memory 250 includes a version memory 350 to store firmware SVNs.

According to one embodiment, verifier 340 receives a SVN associated with firmware (e.g., software) for each IP agent 230 and stores the SVNs within version memory 350. Additionally, verifier 340 verifies the integrity of SVN version memory 350 via a hash algorithm (e.g., Secure Hash Algorithm 2 SHA-2)) performed on the contents of version memory 350 to generate an SVN hash. Subsequently, verifier 340 stores the SVN hash within a non-volatile RAM (NVRAM) 310 within TPM 300, and locks NVRAM 310 such that only the verifier 340 has write-access to NVRAM 310. In yet a further embodiment, verifies the integrity of version memory 350 using TPM 300 prior to storing new (or updated) firmware to firmware memory 255, and writing the associated SVN (or current SVN) to version memory 350. In still a further embodiment, multiple SVNs associated with each IP agent 230 with limited protected persistent hardware can be stored and simultaneously committed.

Prior to writing a firmware SVN to version memory 350, verifier 340 verifies the integrity of the firmware against a manifest packaged with the firmware. Subsequently, the manifest is signed, and the key is rooted in platform 200. Verifier 340 records the current SVN (e.g., the SVN in the manifest) in version memory 350 once the integrity of the firmware has been verified. According to one embodiment, the firmware is approved only upon a determination that the current SVN number in the manifest is greater than or equal to the current SVN number stored in version memory 350. Once approved, the firmware may be stored to firmware memory 255.

Figure 4A:
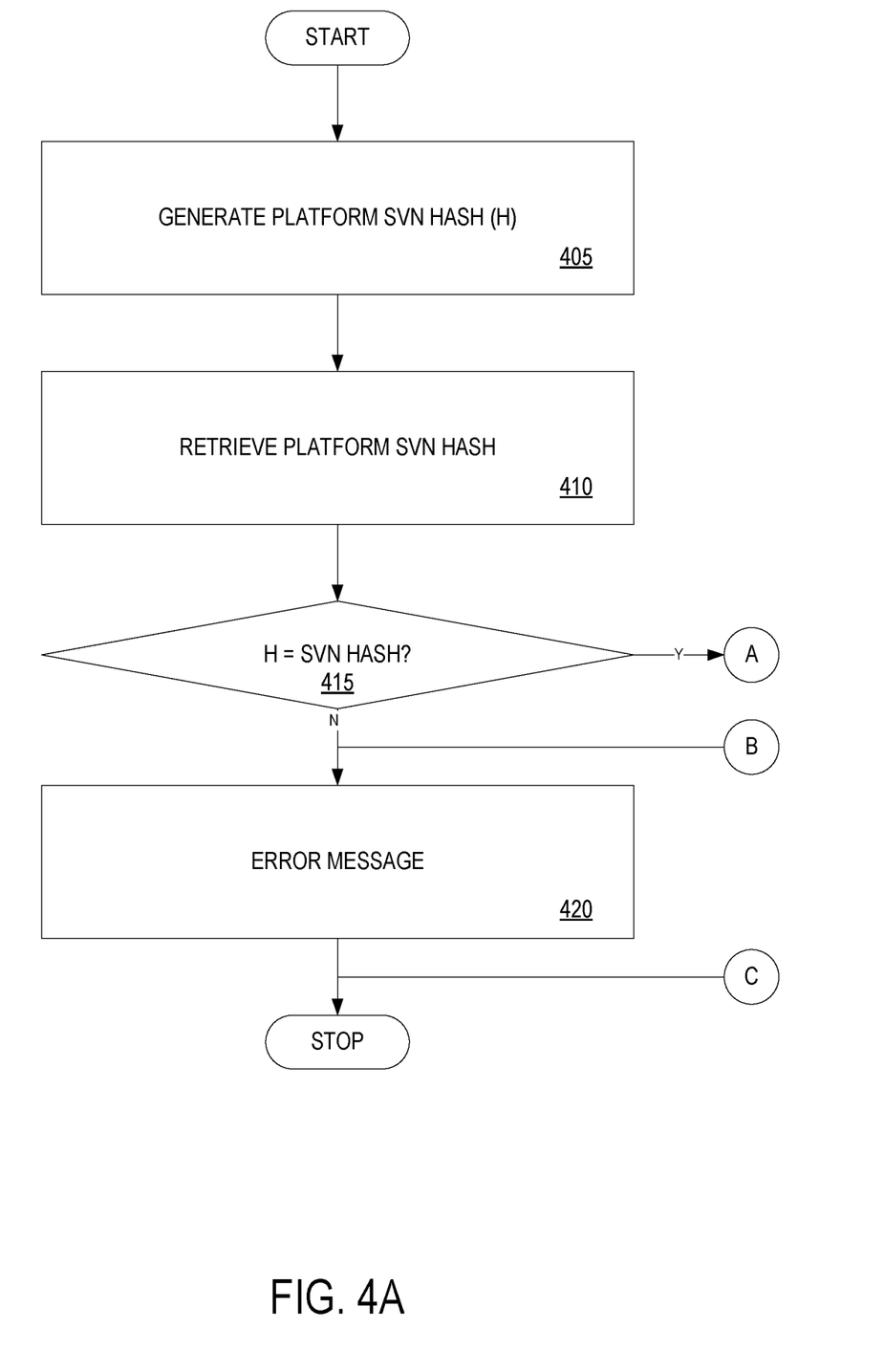
FIGS. 4A & 4B is a flow diagram illustrating one embodiment of a verifier process.
Figure 4B:
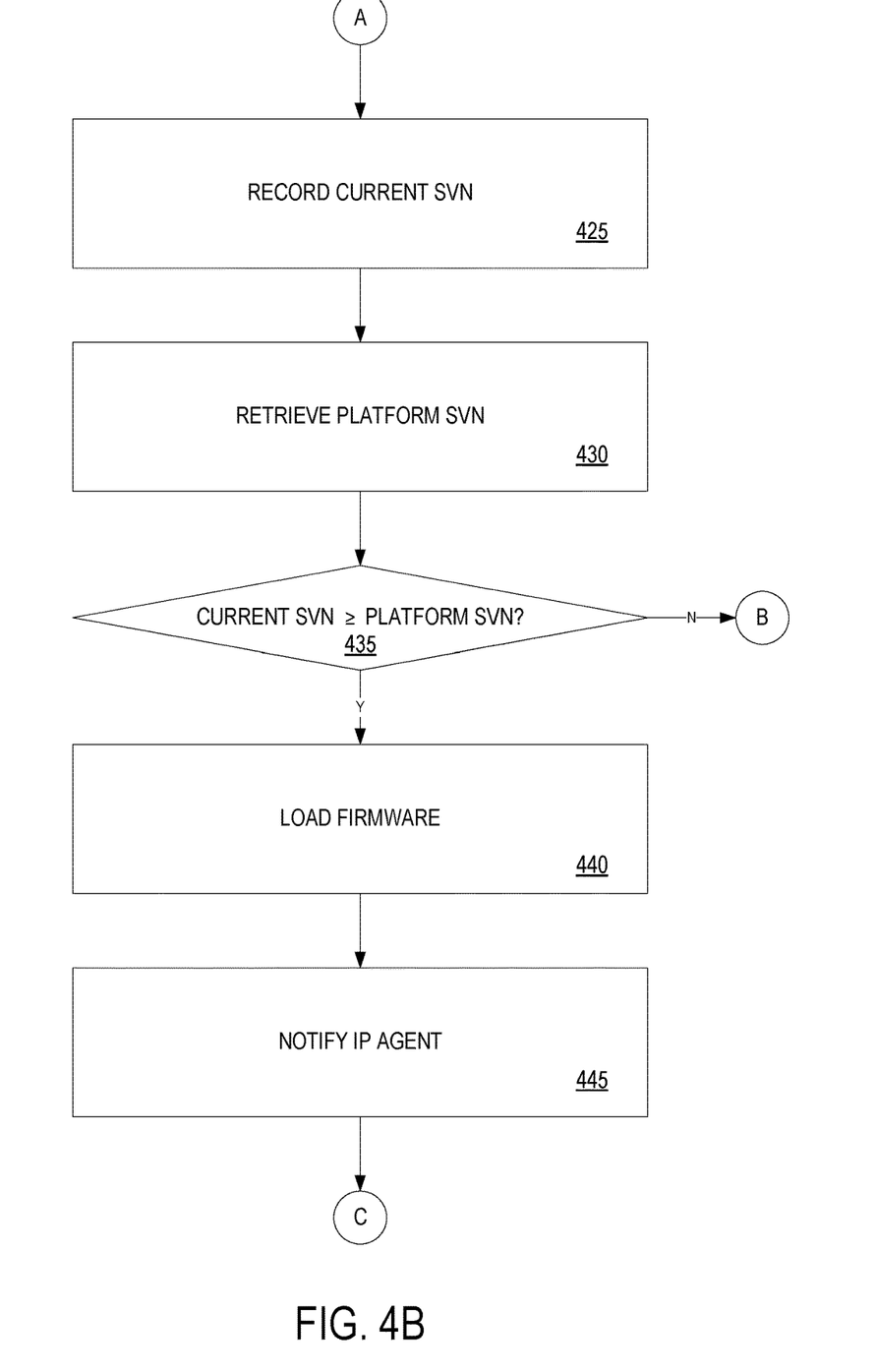

FIGS. 4A&4B is a flow diagram illustrating one embodiment of a verification process performed upon detecting new firmware for an IP agent 230 at platform 200. At processing block 405 (FIG. 4A), a platform SVN hash (H) of version memory 350 is generated (e.g., by a subsequent application of the hashing algorithm to the contents of the version memory 350). At processing block 410, the platform SVN hash is read from NVRAM 310 in TPM 300. At decision block 415, a determination is made as to whether hash H is equal to the SVN hash. If not, an error message is generated, processing block 420. As a result, the new firmware is prevented from being downloaded into firmware memory 255. Upon a determination at decision block 415 that the platform SVN hash matches (e.g., is equal to) the SVN hash, the current SVN of the firmware (e.g., after the integrity of the firmware has been verified) is recorded, processing block 425 (FIG. 4B).

At processing block 430 the platform SVN (e.g., previous SVN) stored in version memory 350 is retrieved. At decision block 435, a determination is made as to whether the current SVN is greater than or equal to the platform SVN. If not, control is returned to processing block 420, where an error message is generated. Upon a determination at block 435 that the current SVN is greater than or equal to the platform SVN, the firmware is loaded (or stored) into non-volatile memory 250, processing block 440. At processing block 450, the IP agent for which the firmware is associated is notified.

According to one embodiment, security controller 240 also includes commit logic to perform a commit function that commit the SVN of the current loaded firmware (e.g., the current SVN) for storage into version memory 350. In such an embodiment, the commit function is performed upon a determination that the functionality of the firmware has been validated. As a result, security controller 240 includes commit logic 342 to perform the commit function as a separate process. In one embodiment, commit logic 342 performs the commit function by examining a commit bit in the IP agent 230 interface 235. In an alternative embodiment, commit logic 342 may perform the commit function by examining a breadcrumb set by the untrusted software prior to committing the firmware to non-volatile memory 250.

In one embodiment, a breadcrumb is a token between the untrusted operating system and trusted BIOS. In such an embodiment, the breadcrumb indicates the identifier of the IP agent to the BIOS. This identifier indicates which IP agent's version number needs to be updated. However, the identifier does not include the actual version number to be updated. In a further embodiment, a bread crumb may be implemented via a shared register (e.g., which survives reset) between the OS and the BIOS. Alternatively, the breadcrumb may be stored in persistent storage where both BIOS and OS have access.

Figure 5:
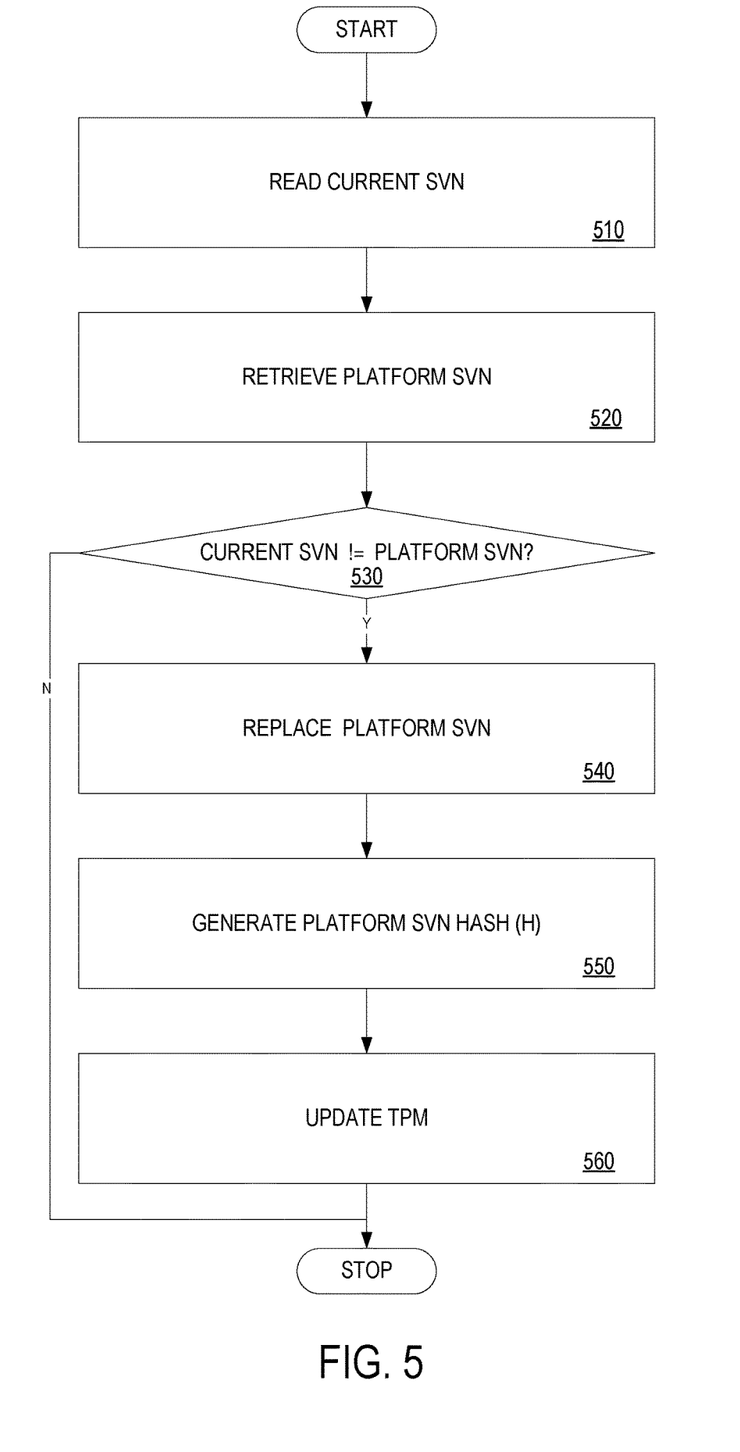
FIG. 5 is a flow diagram illustrating one embodiment of a commit process.

FIG. 5 is a flow diagram illustrating one embodiment of a commit process. At processing block 510, the current SVN is read. At processing block 520, the platform SVN is retrieved from version memory 350. At decision block 530, a determination is made as to whether the current SVN is unequal to the platform SVN. According to one embodiment, the current SVN is read from a SVN storage location into a scratch buffer during implementation, with the previous SVN subsequently being retrieved into the SVN storage location. As a result, the SVN value stored in the scratch buffer is compared to the SVN value stored in the SVN location.

Upon a determination at decision block 530 that the current SVN is equal to the platform SVN, the process has been completed. Otherwise, version memory 350 is updated by replacing the platform SVN with the current SVN, processing block 540. According to one embodiment, a backup of version memory 350 is created prior to performing the process. In such an embodiment, the contents of version memory 350 is stored in the backup version prior to updating version memory 350 with the current SVN. At processing block 550, an updated platform SVN hash of version memory 350 is generated. At processing block 560, the updated platform SVN hash is stored to NVRAM 310 in TPM 300. In a further embodiment, the backup version memory 350 is deleted after the updated SVN hash has been stored.

According to one embodiment, verifier 340 may also perform SVN rollback triggered during a scenario in which an IP agent 230 is refurbished. In such an embodiment, a breadcrumb token is received from an original equipment manufacturer (OEM) that provided the IP agent 230 into a Basic Input/Output System (BIOS) firmware volume (e.g., at non-volatile memory 250). Subsequently, the token is loaded into memory 108 and transmitted to verifier 340, which begins a rollback process after verifying the token.

Figure 6:
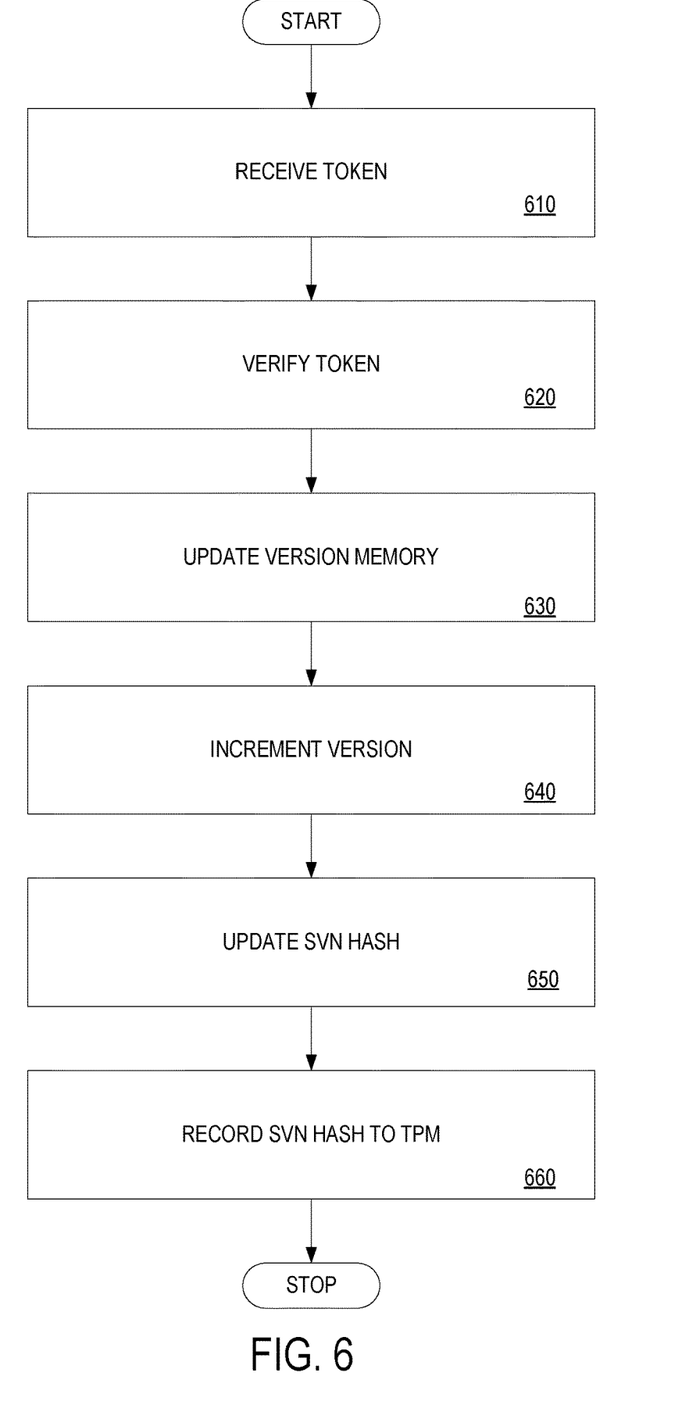
FIG. 6 is a flow diagram illustrating one embodiment of a rollback process.

FIG. 6 is a flow diagram illustrating one embodiment of a rollback process. At processing block 610, a token is received. At processing block 620, the token is verified. At processing block 630, version memory 350 is updated with one or more allowed IP agent software versions. At processing block 640, the contents of version memory 350 is updated. At processing block 650, an updated SVN hash is generated based on the updated contents. At processing block 660, the updated SVN hash is recorded to the TPM. However in other embodiments the SVN hash may be recorded in a replay protected persistent storage.

The above-described mechanism enforces the security version numbers of firmware on a SOC platform while providing an ability to refurbish the platform if needed. Additionally, the mechanism enables an addition of firmware to the platform (e.g., post-ship).

Figure 7:
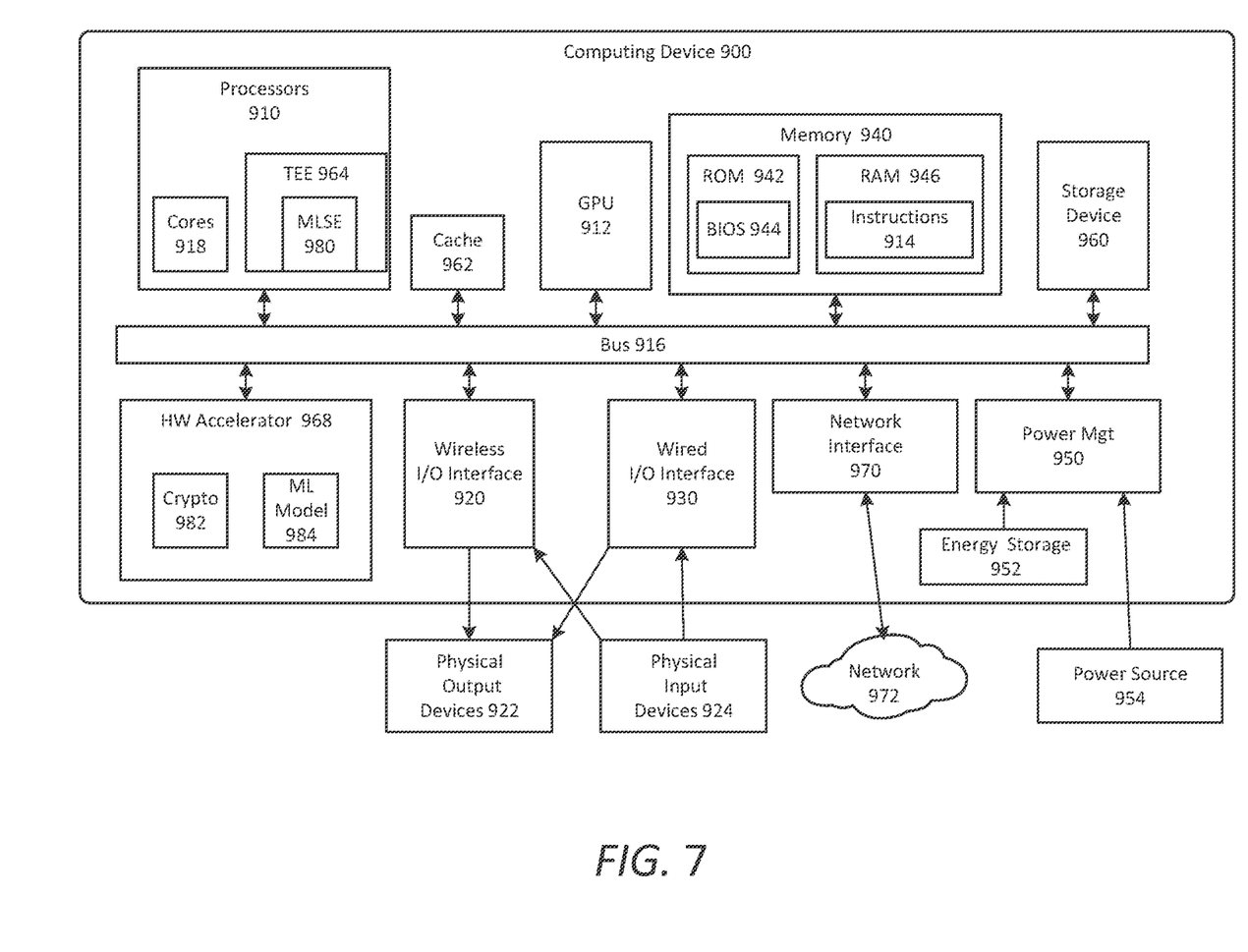
FIG. 7 is a schematic diagram of an illustrative electronic computing device.

FIG. 7 is a schematic diagram of an illustrative electronic computing device to enable enhanced protection against adversarial attacks according to some embodiments. In some embodiments, the computing device 900 includes one or more processors 910 including one or more processors cores 918 and a TEE 964, the TEE including a machine learning service enclave (MLSE) 980. In some embodiments, the computing device 900 includes a hardware accelerator 968, the hardware accelerator including a cryptographic engine 982 and a machine learning model 984. In some embodiments, the computing device is to provide enhanced protections against ML adversarial attacks, as provided in FIGS. 1-6.

The computing device 900 may additionally include one or more of the following: cache 962, a graphical processing unit (GPU) 912 (which may be the hardware accelerator in some implementations), a wireless input/output (I/O) interface 920, a wired I/O interface 930, memory circuitry 940, power management circuitry 950, non-transitory storage device 960, and a network interface 970 for connection to a network 972. The following discussion provides a brief, general description of the components forming the illustrative computing device 900. Example, non-limiting computing devices 900 may include a desktop computing device, blade server device, workstation, or similar device or system.

In embodiments, the processor cores 918 are capable of executing machine-readable instruction sets 914, reading data and/or instruction sets 914 from one or more storage devices 960 and writing data to the one or more storage devices 960. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 918 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 900 includes a bus or similar communications link 916 that communicably couples and facilitates the exchange of information and/or data between various system components including the processor cores 918, the cache 962, the graphics processor circuitry 912, one or more wireless I/O interfaces 920, one or more wired I/O interfaces 930, one or more storage devices 960, and/or one or more network interfaces 970. The computing device 900 may be referred to in the singular herein, but this is not intended to limit the embodiments to a single computing device 900, since in certain embodiments, there may be more than one computing device 900 that incorporates, includes, or contains any number of communicably coupled, collocated, or remote networked circuits or devices.

The processor cores 918 may include any number, type, or combination of currently available or future developed devices capable of executing machine-readable instruction sets.

The processor cores 918 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 916 that interconnects at least some of the components of the computing device 900 may employ any currently available or future developed serial or parallel bus structures or architectures.

The system memory 940 may include read-only memory ("ROM") 642 and random access memory ("RAM") 946. A portion of the ROM 942 may be used to store or otherwise retain a basic input/output system ("BIOS") 944. The BIOS 944 provides basic functionality to the computing device 900, for example by causing the processor cores 918 to load and/or execute one or more machine-readable instruction sets 914. In embodiments, at least some of the one or more machine-readable instruction sets 914 cause at least a portion of the processor cores 918 to provide, create, produce, transition, and/or function as a dedicated, specific, and particular machine, for example a word processing machine, a digital image acquisition machine, a media playing machine, a gaming system, a communications device, a smartphone, or similar.

The computing device 900 may include at least one wireless input/output (I/O) interface 920. The at least one wireless I/O interface 920 may be communicably coupled to one or more physical output devices 922 (tactile devices, video displays, audio output devices, hardcopy output devices, etc.). The at least one wireless I/O interface 920 may communicably couple to one or more physical input devices 924 (pointing devices, touchscreens, keyboards, tactile devices, etc.). The at least one wireless I/O interface 920 may include any currently available or future developed wireless I/O interface. Example wireless I/O interfaces include, but are not limited to: BLUETOOTH®, near field communication (NFC), and similar.

The computing device 900 may include one or more wired input/output (I/O) interfaces 930. The at least one wired I/O interface 930 may be communicably coupled to one or more physical output devices 922 (tactile devices, video displays, audio output devices, hardcopy output devices, etc.). The at least one wired I/O interface 930 may be communicably coupled to one or more physical input devices 924 (pointing devices, touchscreens, keyboards, tactile devices, etc.). The wired I/O interface 930 may include any currently available or future developed I/O interface. Example wired I/O interfaces include, but are not limited to: universal serial bus (USB), IEEE 1394 ("FireWire"), and similar.

The computing device 900 may include one or more communicably coupled, non-transitory, data storage devices 960. The data storage devices 960 may include one or more hard disk drives (HDDs) and/or one or more solid-state storage devices (SSDs). The one or more data storage devices 960 may include any current or future developed storage appliances, network storage devices, and/or systems. Non-limiting examples of such data storage devices 960 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 960 may include one or more removable storage devices, such as one or more flash drives, flash memories, flash storage units, or similar appliances or devices capable of communicable coupling to and decoupling from the computing device 900.

The one or more data storage devices 960 may include interfaces or controllers (not shown) communicatively coupling the respective storage device or system to the bus 916. The one or more data storage devices 960 may store, retain, or otherwise contain machine-readable instruction sets, data structures, program modules, data stores, databases, logical structures, and/or other data useful to the processor cores 918 and/or graphics processor circuitry 912 and/or one or more applications executed on or by the processor cores 918 and/or graphics processor circuitry 912. In some instances, one or more data storage devices 960 may be communicably coupled to the processor cores 918, for example via the bus 916 or via one or more wired communications interfaces 930 (e.g., Universal Serial Bus or USB); one or more wireless communications interfaces 920 (e.g., Bluetooth®, Near Field Communication or NFC); and/or one or more network interfaces 970 (IEEE 802.3 or Ethernet, IEEE 802.11, or Wi-Fi®, etc.).

Processor-readable instruction sets 914 and other programs, applications, logic sets, and/or modules may be stored in whole or in part in the system memory 940. Such instruction sets 914 may be transferred, in whole or in part, from the one or more data storage devices 960. The instruction sets 914 may be loaded, stored, or otherwise retained in system memory 940, in whole or in part, during execution by the processor cores 918 and/or graphics processor circuitry 912.

The computing device 900 may include power management circuitry 950 that controls one or more operational aspects of the energy storage device 952. In embodiments, the energy storage device 952 may include one or more primary (i.e., non-rechargeable) or secondary (i.e., rechargeable) batteries or similar energy storage devices. In embodiments, the energy storage device 952 may include one or more supercapacitors or ultracapacitors. In embodiments, the power management circuitry 950 may alter, adjust, or control the flow of energy from an external power source 954 to the energy storage device 952 and/or to the computing device 900. The power source 954 may include, but is not limited to, a solar power system, a commercial electric grid, a portable generator, an external energy storage device, or any combination thereof.

For convenience, the processor cores 918, the graphics processor circuitry 912, the wireless I/O interface 920, the wired I/O interface 930, the storage device 960, and the network interface 970 are illustrated as communicatively coupled to each other via the bus 916, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 918 and/or the graphics processor circuitry 912. In some embodiments, all or a portion of the bus 916 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus to a non-volatile memory, including firmware memory to store agent firmware associated with each of a plurality of interconnect protocol (IP) agents and version memory to store security version numbers (SVNs) included in the agent firmware, a security controller comprising verifier logic to verify an integrity of the version memory by applying a hash algorithm to contents of the version memory to generate a SVN hash, and a trusted platform module (TPM) to store the SVN hash.

Example 2 includes the subject matter of Example 1, wherein the verifier logic verifies an integrity of the version memory upon receiving agent firmware by applying the hash algorithm to contents of the version memory to generate a check hash and comparing the check hash to the SVN hash stored in the TPM.

Example 3 includes the subject matter of Examples 1 and 2, wherein the verifier logic verifies an integrity of the agent firmware upon determining that the check hash matches the SVN hash.

Example 4 includes the subject matter of Examples 1-3, wherein the verifier logic verifies the integrity of the agent firmware by determining whether a SVN included in the received agent firmware is greater than a SVN associated with the agent firmware stored in the version memory.

Example 5 includes the subject matter of Examples 1-4, wherein the received agent firmware is stored in the firmware memory upon a determination that the SVN included in the received agent firmware is greater than a SVN associated with the agent firmware stored in the version memory.

Example 6 includes the subject matter of Examples 1-5, wherein the security controller further comprises commit logic to store the SVN included in the received agent firmware into the version memory upon storing the received agent firmware in the firmware memory.

Example 7 includes the subject matter of Examples 1-6, wherein the commit logic stores the SVN in the version memory upon a determination that functionality of the received agent firmware has been validated.

Example 8 includes the subject matter of Examples 1-7, wherein the verifier logic further performs a SVN rollback to store refurbished agent firmware.

Some embodiments pertain to Example 9 that includes at least one computer readable medium having instructions stored thereon, which when executed by one or more processors, cause the processors to verify an integrity of a version memory storing included in a non-volatile memory storing security version numbers (SVNs) associated with agent firmware, including applying a hash algorithm to contents of the version memory to generate a SVN hash and store the SVN hash in a trusted platform module (TPM).

Example 10 includes the subject matter of Example 9, having instructions stored thereon, which when executed by one or more processors, further cause the processors to receive agent firmware verify an integrity of the version memory upon by applying the hash algorithm to contents of the version memory to generate a check hash and compare the check hash to the SVN hash stored in the TPM.

Example 11 includes the subject matter of Examples 9 and 10, having instructions stored thereon, which when executed by one or more processors, further cause the processors to verify an integrity of the agent firmware upon determining that the check hash matches the SVN hash.

Example 12 includes the subject matter of Examples 9-11, wherein verifying an integrity of the agent firmware comprises determining whether a SVN included in the received agent firmware is greater than a SVN associated with the agent firmware stored in the version memory.

Example 13 includes the subject matter of Examples 9-12, having instructions stored thereon, which when executed by one or more processors, cause the processors to store the received agent firmware in a firmware memory upon a determination that the SVN included in the received agent firmware is greater than a SVN associated with the agent firmware stored in the version memory.

Example 14 includes the subject matter of Examples 9-13, having instructions stored thereon, which when executed by one or more processors, cause the processors to store the SVN included in the received agent firmware into the version memory upon storing the received agent firmware in the firmware memory.

Some embodiments pertain to Example 15 that includes a method to verify firmware in a computing system, comprising verifying an integrity of a version memory storing included in a non-volatile memory storing security version numbers (SVNs) associated with agent firmware, including applying a hash algorithm to contents of the version memory to generate a SVN hash and storing the SVN hash in a trusted platform module (TPM).

Example 16 includes the subject matter of Example 15, further comprising receiving agent firmware, verifying an integrity of the version memory upon by applying the hash algorithm to contents of the version memory to generate a check hash and comparing the check hash to the SVN hash stored in the TPM.

Example 17 includes the subject matter of Examples 15 and 16, further comprising verifying an integrity of the agent firmware upon determining that the check hash matches the SVN hash.

Example 18 includes the subject matter of Examples 15-17, wherein verifying an integrity of the agent firmware comprises determining whether a SVN included in the received agent firmware is greater than a SVN associated with the agent firmware stored in the version memory.

Example 19 includes the subject matter of Examples 15-18, further comprising storing the received agent firmware in a firmware memory upon a determination that the SVN included in the received agent firmware is greater than a SVN associated with the agent firmware stored in the version memory.

Example 20 includes the subject matter of Examples 15-19, further comprising storing the SVN included in the received agent firmware into the version memory upon storing the received agent firmware in the firmware memory.

The embodiments of the examples have been described above with reference to specific embodiments. Persons skilled in the art, however, will understand that various modifications and changes may be made thereto without departing from the broader spirit and scope as set forth in the appended claims. The foregoing description and drawings are, accordingly, to be regarded in an illustrative rather than a restrictive sense.

What is claimed is:

1. An apparatus to verify firmware in a computing system, comprising:
 a non-volatile memory, including:
  firmware memory to store agent firmware associated with each of a plurality of interconnect protocol (IP) agents; and
  version memory to store security version numbers (SVNs) included in the agent firmware;
 a security controller comprising:
  commit logic to store the SVNs into the version memory upon a determination that functionality of the received agent firmware has been validated; and
  verifier logic to verify an integrity of the version memory by applying a hash algorithm to contents of the version memory to generate a SVN hash; and
 a trusted platform module (TPM) to store the SVN hash.

2. The apparatus of claim 1, wherein the verifier logic verifies an integrity of the version memory upon receiving agent firmware by applying the hash algorithm to contents of the version memory to generate a check hash and comparing the check hash to the SVN hash stored in the TPM.

3. The apparatus of claim 2, wherein the verifier logic verifies an integrity of the agent firmware upon determining that the check hash matches the SVN hash.

4. The apparatus of claim 3, wherein the verifier logic verifies the integrity of the agent firmware by determining whether a SVN included in the received agent firmware is greater than a SVN associated with the agent firmware stored in the version memory.

5. The apparatus of claim 4, wherein the received agent firmware is stored in the firmware memory upon a determination that the SVN included in the received agent firmware is greater than a SVN associated with the agent firmware stored in the version memory.

6. The apparatus of claim 1, wherein the verifier logic further performs a SVN rollback to store refurbished agent firmware.

7. At least one non-transitory computer readable medium having instructions stored thereon, which when executed by one or more processors, cause the processors to:
 store security version numbers (SVNs) associated with agent firmware into a version memory included in a non-volatile memory upon a determination that functionality of received agent firmware has been validated;
 verify an integrity of the version memory, including applying a hash algorithm to contents of the version memory to generate a SVN hash; and
 store the SVN hash in a trusted platform module (TPM).

8. The computer readable medium of claim 7, having instructions stored thereon, which when executed by one or more processors, further cause the processors to:
   receive agent firmware;
   verify an integrity of the version memory upon by applying the hash algorithm to contents of the version memory to generate a check hash; and
   compare the check hash to the SVN hash stored in the TPM.

9. The computer readable medium of claim 8, having instructions stored thereon, which when executed by one or more processors, further cause the processors to verify an integrity of the agent firmware upon determining that the check hash matches the SVN hash.

10. The computer readable medium of claim 9, wherein verifying an integrity of the agent firmware comprises determining whether a SVN included in the received agent firmware is greater than a SVN associated with the agent firmware stored in the version memory.

11. The computer readable medium of claim 10, having instructions stored thereon, which when executed by one or more processors, cause the processors to store the received agent firmware in a firmware memory upon a determination that the SVN included in the received agent firmware is greater than a SVN associated with the agent firmware stored in the version memory.

12. The computer readable medium of claim 11, having instructions stored thereon, which when executed by one or more processors, cause the processors to store the SVN included in the received agent firmware into the version memory upon storing the received agent firmware in the firmware memory.

13. A method to verify firmware in a computing system, comprising:
   storing security version numbers (SVNs) associated with agent firmware into a version memory included in a non-volatile memory upon a determination that functionality of received agent firmware has been validated;
   verifying an integrity of the version memory, including applying a hash algorithm to contents of the version memory to generate a SVN hash; and
   storing the SVN hash in a trusted platform module (TPM).

14. The method of claim 13, further comprising:
   receiving agent firmware;
   verifying an integrity of the version memory upon by applying the hash algorithm to contents of the version memory to generate a check hash; and
   comparing the check hash to the SVN hash stored in the TPM.

15. The method of claim 14, further comprising verifying an integrity of the agent firmware upon determining that the check hash matches the SVN hash.

16. The method of claim 15, wherein verifying an integrity of the agent firmware comprises determining whether a SVN included in the received agent firmware is greater than a SVN associated with the agent firmware stored in the version memory.

17. The method of claim 16, further comprising storing the received agent firmware in a firmware memory upon a determination that the SVN included in the received agent firmware is greater than a SVN associated with the agent firmware stored in the version memory.

18. The method of claim 17, further comprising storing the SVN included in the received agent firmware into the version memory upon storing the received agent firmware in the firmware memory.

\* \* \* \* \*